3,065,224
PROCESS FOR THE PRODUCTION OF ADDITION PRODUCTS OF ORGANIC ISOCYANATES AND ORGANIC CARBODIIMIDES
Rudolf Hofmann, Dormagen, Erich Schmidt, Munich, and Alfred Reichle and Fritz Moosmüller, Dormagen, Germany, assignors to Farbenfabriken Bayer Aktiengesellschaft, Leverkusen, Germany, a corporation of Germany
No Drawing. Continuation of application Ser. No. 592,237, June 19, 1956. This application Jan. 25, 1961, Ser. No. 84,765
Claims priority, application Germany June 24, 1955
2 Claims. (Cl. 260—239)

This invention relates to the production of addition products of carbodiimides and isocyanates.

This application is a continuation application of the copending application Serial No. 592,237, filed June 19, 1956, now abandoned.

Addition products of carbodiimides and isocyanates have hitherto been unknown. It has now been found that carbodiimides will combine with monoisocyanates or polyisocyanates to form definite compounds.

Accordingly the present invention provides addition compounds of carbodiimides and mono- or polyisocyanates. The new addition compounds of the invention are prepared by reacting a carbodiimide with a mono- or polyisocyanate.

The reaction is preferably carried out by bringing together the two components in equivalent amounts, that is to say, in such manner that one —N=C=N-group is present per —N=C=-group. The reaction can be carried out in the presence or absence of an inert solvent or diluent. Generally speaking, the reaction proceeds without supplementary heating at normal temperature and with evolution of heat. It is frequently necessary to slow down the reaction by cooling. In cases in which the reaction only starts slowly, it is advantageous to accelerate this reaction by introducing a suitable catalyst, such as for example copper or copper compounds and more especially cuprous chloride.

The following carbodiimides are examples of those suitable for the production of the addition compounds: diisopropyl carbodiimide, dicyclohexyl carbodiimide, methyl-tert.-butyl carbodiimide, tert.-butyl phenyl carbodiimide and diphenyl carbodiimide.

Examples of suitable monoisocyanates and polyisocyanates which can be used according to the invention, are those of aromatic nature, such as phenyl isocyanate, α-naphthyl isocyanate, tolylene diisocyanate and also their methoxy substitution products and aliphatic and cycloaliphatic monoisocyanates and polyisocyanates, such as stearyl isocyanate, hexamethylene diisocyanate, cyclohexyl isocyanate and 1,4-diisocyanatocyclohexane. The isocyanates can contain substituents which can in their turn also be reactive, for example, 1-chloro-6-isocyanatohexane.

The addition products of carbodiimides and isocyanates are split on heating into their initial products. This property is very valuable technically, since the novel addition products constitute substances splitting off isocyanates. They are characterized by the fact that they split up at low temperatures, in fact with many of them temperatures of 50–100° C. are sufficient. If solutions, emulsions or mixtures of such addition products are prepared in water or in alcohols, these are stable in the cold state, i.e. scarcely and reaction takes place at room temperature. The splitting of the addition compounds can be activated by heat or catalysts, such as for example cuprous chloride and a reaction between the isocyanate or carbodiimide and alcohol or water can be produced.

Moreover, these addition products of carbodiimides and isocyanates can also be considered as sources of carbodiimides and these can be used for reactions of carbodiimides with alcohols of low or high molecular weight, for example by the process disclosed in co-pending application serial No. 528,822, which was filed August 16, 1955, by Erich Schmidt, Fritz Moosmüller and Robert Schnegg, assigned to the same assignee; now U.S. Patent 2,906,749.

The following examples further illustrate the invention without, in any way, limiting it thereto.

*Example 1*

63.1 grams (0.5 mol) of diisopropyl carbodiimide are initially placed in a 250 cc. flask having a ground stopper and provided with a reflux condenser having a calcium chloride tube and a dropping funnel and 59.5 grams (0.5 mol) of phenyl isocyanate are slowly added dropwise. The temperature of the reaction solution increases considerably. After cooling, seeding crystals are added, whereupon the thickly viscous reaction product starts to crystallize. As soon as crystallization is completed, the crystals are dropped on to a clay dish and dried over caustic potash in a vacuum desiccator. Melting point, approximately 38° C. The nitrogen content of the reaction product conforms to that which is calculated for an addition product of 1 mol of diisopropyl carbodiimide + 1 mol of phenyl isocyanate.

If an attempt is made to distill the addition product in vacuo, it distills over continuously at a temperature between 62 and 67° C. at a pressure of 20 millimeters Hg. To all appearances, the addition product in the distillation flask dissociates into diisopropyl carbodiimide (B.P.$_{10}$ 36–37° C.) and phenyl isocyanate (B.P.$_{20}$ 62° C.), which distill together and recombine in the receiver with an appreciable increase in temperature. After a certain time, the addition product starts to crystallize in the receiver.

The addition product is satisfactorily soluble in most conventional organic solvents, such as for example methanol, ethanol, acetone, ether, methylene chloride, carbon tetrachloride and benzene, is less soluble in petroleum ether and insoluble in water.

The addition product dissolves readily in the cold state in alcohols without a reaction being initiated between phenyl isocyanate or diisopropyl carbodiimide and the alcohol. When water is added, the addition compound initially separates out in the form of an oil which soon crystallizes. The filtered and dried crystals have a melting point of 39° C.

Whereas the alcoholic solutions of the addition compound are stable in the cold, a reaction is initiated on heating and both the corresponding phenyl urethane and the isourea ether are formed. By adding copper or copper compounds, such as for example cuprous chloride, cupric sulfate, cupric oxychloride or cupric acetate, in catalytic amounts to the alcoholic solution of the addition compound, a slow reaction between phenyl isocyanate or diisopropyl carbodiimide and the alcohol can be obtained in the cold.

*Example 2*

50.48 grams (0.4 mol) of diisopropyl carbodiimide and 33.64 grams (0.2 mol) hexamethylene diisocyanate are brought together in a 150 cc. flask with a ground stopper. No detectable heat change or visible change occurs. In an attempt to distill the liquid under reduced pressure diisopropyl carbodiimide distills over at an oil bath temperature of 100° C. However, it can be proved that an addition compound of 2 mols of diisopropyl carbodiimide and 1 mol of hexamethylene diisocyanate is formed, since no cross-linking of the cellulose acetate occurs at room temperature in the "cellit"-test according to S. Petersen (Liebigs Annalen der Chemie, 562, 21q (1949), whereas the cellulose acetate foil becomes insoluble in both acetone and pyridine at temperatures higher than 100° C. The addition compound can also be dissolved in alcohol or cyclohexylamine, without the occurrence of any reaction which could be detected by strongly positive heat change. A rapid reaction with the alcohol or amine can be initiated by heating and a slow reaction therewith can be initiated by adding catalytic traces of copper salts.

*Example 3*

25.24 grams (0.2 mol) of diisopropyl carbodiimide and 33.64 grams (0.2 mol) of hexamethylene diisocyanate are brought together in a flask with a ground stopper, no detectable heat change being produced. The liquid gradually becomes more viscous and after a few days it has a rubber-like consistency. The reaction can be accelerated by adding copper compounds, such as cuprous chloride, copper acetate or cupric chloride.

*Example 4*

25.24 grams (0.2 mol) of diisopropyl carbodiimide are placed in a 100 cc. flask having a ground stopper and equipped with a reflux condenser with a calcium chloride tube and dropping funnel and 17.42 grams (0.1 mol) of toluylene diisocyanate are slowly added dropwise. The temperature of the reaction solution increases appreciably, but otherwise there is no visible change. In the "cellit" test, the foils only become insoluble in acetone and pyridine at temperatures higher than 100° C.

*Example 5*

23.82 grams (0.2 mol) of phenylisocyanate are placed in a 100 cc. flask having a ground stopper and equipped with a reflux condenser with a calcium chloride tube and dropping funnel, and 22.42 grams (0.2 mol) of methyl-tert.-butyl carbodiimide are added dropwise, the reaction solution being heated to a detectable degree.

The liquid addition product can be dissolved inter alia in methanol. It does not react with alcohol at room temperature, while a slow reaction of both the phenyl isocyanate and the carbodiimide with the alcohol can be obtained by adding cuprous chloride and a rapid reaction can be obtained by heating.

*Example 6*

22.42 grams (0.2 mol) of methyl tert.-butyl carbodiimide and 16.82 grams (0.1 mol) hexamethylene diisocyanate are combined in a 100 cc. flask. The products only react slowly without appreciable heat change. An acceleration of the reaction can be obtained by catalytic amounts of cuprous chloride.

In the "cellit" test, the foils only become insoluble in acetone by heating to more than 150° C.

*Example 7*

34.83 grams (0.2 mol) of tert.-butyl phenyl carbodiimide and 23.82 grams (0.2 mol) of phenyl isocyanate are brought together in a 100 cc. flask. After standing for a relatively long period, the addition compound starts to crystallize out. The crystals are filtered with suction, transferred to a clay dish and dried over caustic soda in a vacuum desiccator. M.P. 68° C.

The addition compound dissolves easily in the cold in methanol acetone, methyl chloride, chloroform, carbon tetrachloride and benzene, is moderately soluble in petroleum ether and is insoluble in pyridine and water, even with heating. It is stable at room temperature in methanolic solution, and can be precipitated again without modification by adding water.

The nitrogen content of the crystallized products agrees very well with the nitrogen value calculated for an addition compound of 1 mol of tert.-butyl phenyl carbodiimide+1 mol phenylisocyanate.

*Example 8*

34.83 grams (0.2 mol) tert.-butyl phenyl carbodiimide and 16.82 grams (0.1 mol) hexamethylene diisocyanate are brought together in a 100 cc. flask. The reaction proceeds without any detectable increase in temperature. The reaction product remains liquid. In the "cellit" test, the foils only become insoluble in acetone and pyridine by heating to higher than 100° C.

*Example 9*

25.24 grams (0.2 mol) diisopropyl carbodiimide are placed in a flask having a ground stopper and equipped with a reflux condenser with a calcium chloride tube and dropping funnel, and 34.24 grams (0.2 mol) α-naphthyl isocyanate are added dropwise, the temperature of the reaction solution increasing appreciably. The reaction product remains liquid.

The addition compound does not react with methanol in the cold and can be separated in liquid form from the methanolic solution again by dilution with water.

*Example 10*

25.24 grams (0.2 mol) of diisopropyl carbodiimide are placed in a flask having a ground stopper and equipped with a reflux condenser with a calcium chloride tube and dropping funnel, and 26.92 grams (0.2 mol) of cyclohexyl isocyanate are added dropwise. The reaction product remains liquid.

The addition compound does not react with methanol in the cold. It can be separated again in liquid form by diluting the methanolic solution with water.

*Example 11*

32.33 grams (0.2 mol) of 1-chloro-6-isocyanatohexane and 25.22 grams (0.2 mol) of diisopropyl carbodiimide are brought together in a 100 cc. flask. The reaction product is a liquid which does not react with methanol in the cold and can be separated out again without change in liquid form by diluting the methanolic solution with water.

We claim:

1. An addition compound containing equivalent amounts of an organic carbodiimide selected from the group consisting of diisopropyl carbodiimide, methyl-tert. butyl carbodiimide, tert.-butyl phenyl carbodiimide and an organic isocyanate selected from the group consisting of phenyl isocyanate, hexamethylene diisocyanate, toluylene diisocyanate, α-naphthyl isocyanate, cyclohexyl isocyanate and 1-chloro-6-isocyanatohexane, said addition compound containing the isocyanate and carbodiimide groups in a non-reactive form and capable of being split at an elevated temperature into the component carbodiimide and organic isocyanate in free reactive form.

2. An addition compound of equivalent amounts of phenyl isocyanate and diisopropylcarbodiimide containing isocyanate and carbodiimide groups in a non-reactive form and capable of being split at an elevated temperature into said diisopropylcarbodiimide and phenylisocyanate in free reactive form.

No references cited.